United States Patent [19]
Frännhagen et al.

[11] Patent Number: 6,049,144
[45] Date of Patent: Apr. 11, 2000

[54] RECHARGEABLE BATTERY WITH A BUILT-IN SAFETY CIRCUIT FOR A PORTABLE ELECTRIC APPARATUS

[75] Inventors: Björn Frännhagen, Lund, Sweden; Timothy Banyas, Cary, N.C.

[73] Assignee: Telefonaktiebolaget LM Ericsson, Stockholm, Sweden

[21] Appl. No.: 08/996,473

[22] Filed: Dec. 22, 1997

[30] Foreign Application Priority Data

Dec. 23, 1996 [SE] Sweden ................................. 9604766

[51] Int. Cl.⁷ .................................................. H01H 35/00
[52] U.S. Cl. .......................... 307/130; 320/136; 361/79
[58] Field of Search .................................. 307/112, 116, 307/125, 126, 130, 131; 320/136, 147, 161–163; 361/56, 79, 88, 90, 91, 93, 100, 101, 104

[56] References Cited

U.S. PATENT DOCUMENTS

| | | |
|---|---|---|
| 3,708,738 | 1/1973 | Crawford et al. |
| 5,164,874 | 11/1992 | Okano et al. |
| 5,179,337 | 1/1993 | Staarman et al. ............... 320/136 |
| 5,355,073 | 10/1994 | Nguyen ........................... 320/116 |
| 5,625,273 | 4/1997 | Fehling et al. .................. 320/136 |
| 5,640,150 | 6/1997 | Atwater ............................ 340/636 |
| 5,764,033 | 6/1998 | Tamai ............................... 320/132 |

FOREIGN PATENT DOCUMENTS

| | | |
|---|---|---|
| 2-250634 | 10/1990 | Japan . |
| 7-154922 | 10/1995 | Japan . |

*Primary Examiner*—Jeffrey Gaffin
*Assistant Examiner*—Peter Zura
*Attorney, Agent, or Firm*—Burns, Doane, Swecker & Mathis, L.L.P.

[57] ABSTRACT

A rechargeable battery for a portable electric apparatus has at least one battery cell and a fuse device connected in series with the battery cell. Furthermore, the battery has a voltage-controlled active device, which is connected in parallel to the battery cell and which is arranged to assume a substantially non-conductive state and a conductive state, respectively, in response to the voltage at a control input, and a reference voltage device, which is connected to the control input of the active device. The active device is arranged to switch from the non-conductive state to the conductive state, when the voltage across the battery cell deviates, by a predetermined value, from a reference voltage supplied by the reference voltage device, thereby establishing a short circuit across the battery cell and release of the fuse device. The voltage-controlled active device, the reference voltage device and the fuse device form an integrated electronic component.

8 Claims, 1 Drawing Sheet

RECHARGEABLE BATTERY WITH A BUILT-IN SAFETY CIRCUIT FOR A PORTABLE ELECTRIC APPARATUS

TECHNICAL FIELD

The present invention relates to a rechargeable battery for a portable electric apparatus, comprising at least one battery cell and a fuse device connected in series with the battery cell.

BACKGROUND

Rechargeable batteries of the kind described above are used as power supplies for a variety of portable electric apparatuses, such as mobile telephones, portable computers, personal digital assistants (PDA), hand-held communicators, etc. A mobile telephone for any commonly used mobile telecommunication system (for instance GSM) will be used throughout this document as an example of such portable electric apparatuses, thereby specifically not limiting the present invention to mobile telephones only.

Rechargeable batteries of the type described above are provided with more or less sophisticated safety circuits for preventing an occurring malfunction from creating damage of a more serious kind, for instance due to fire or explosion. A frequently used type of batteries are batteries comprising lithium-based battery cells. Lithium-based batteries have several advantages, such as a high energy density and thereby a long operation time between subsequent rechargings, but such batteries are sensible to abnormally high voltages or currents as a consequence of an occurred electric malfunction, for instance a short circuit. These days rechargeable batteries are often provided with a safety circuit in the form of a printed circuit board in the battery pack. A circuit is arranged on this printed circuit board for monitoring various battery parameters, such as the cell voltage across individual battery cells, the current through the cells, etc. Furthermore, the circuit board comprises active and resetable circuits, which in response to the detected battery parameters are arranged to for instance conduct away excessively strong electric currents when a malfunction condition occurs.

Such a rather complex safety arrangement has a disadvantage particularly as regards the relatively high component and manufacturing costs. In addition the circuit board has a certain physical shape, which makes it difficult to minimize the size of the battery pack to such an extent, which otherwise would be desired.

A less complex solution is disclosed in JP-A-2250634, wherein the safety circuit comprises a reference voltage device in the form of a comparator, which is arranged to detect an occurring overvoltage situation and in response thereof supply a voltage indicative of the overvoltage situation to an active device in the form of a thyristor. As a consequence, the thyristor will switch from a normal non-conductive state to a conductive state, wherein a shortcircuiting current will flow through the thyristor and through a fuse device, which will release or melt and cause an open circuit protecting the battery from the over-voltage.

A similar solution is disclosed in JP-A-7154922, where a transistor acts as the active device and a microcomputer acts as the reference voltage device.

U.S. Pat. No. 5,164,874 relates to an apparatus for protecting against overvoltage, comprising a PN junction zener diode as the reference voltage device and a PNPN junction thyristor as the active device. The reference voltage device and the active device are integrally formed as an integrated circuit (IC) with two terminals, which are arranged to be electrically connected to a first and a second side, respectively, of a load to be protected. A conventional fuse device is separately connected in series with the protective IC apparatus.

SUMMARY

The object of the present invention is to provide a safety circuit for a rechargeable battery, which may be realized by a minimum number of components (and hence at a cost minimum) and which is well adapted to be mounted in the battery at the manufacture thereof.

This object is achieved by a battery for a portable electric apparatus, comprising at least one battery cell; a fuse device connected in series with the battery cell; a voltage-controlled active device, which is connected in parallel to the battery cell and which is arranged to assume a substantially non-conductive state and a conductive state, respectively, in response to the voltage at a control input; and a reference voltage device, which is connected to the control input of the active device. The active device is arranged to switch from the non-conductive state to the conductive state, once the voltage across the battery cell deviates, by a predetermined value, from a reference voltage supplied from the reference voltage device, thereby creating a short-circuit across the battery cell and releasing the fuse device. The voltage-controlled active device, the reference voltage device and the fuse device form an integrated electronic component.

Other objects, advantages and features of preferred embodiments of the present invention will appear from the following detailed disclosure and from the appended drawing with its figures.

BRIEF DESCRIPTION OF THE DRAWINGS

The invention will now be described in more detail in the following, reference being made to the accompanying drawing, in which.

DETAILED DESCRIPTION

Figure 1:
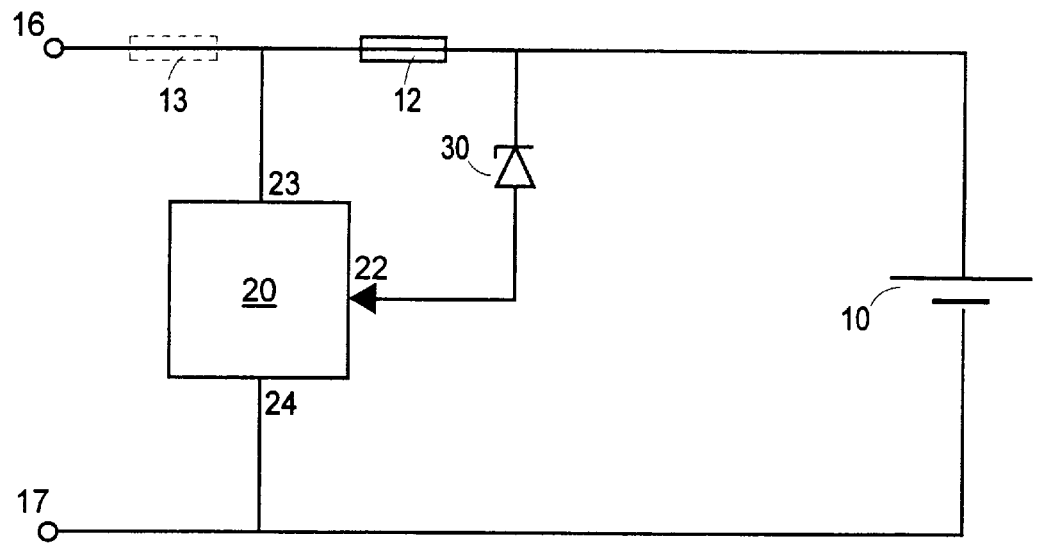
FIG. 1 is a schematic block diagram illustrating the fundamental idea of the invention and FIG. 2 is a schematic block diagram of a rechargeable battery according to an exemplary embodiment of the invention.

FIG. 1 gives an illustration of the rechargeable battery with its safety circuit according to the present invention. For clarifying reasons the battery is only illustrated to have one single battery cell 10, but the battery may, within the scope of the invention, just as well comprise a plurality of battery cells connected in series with each other, as is well-known in the technical field and will thus be readily realized by a man skilled in the art. The battery has two external terminals 16 and 17 for connection to the portable electric apparatus, to which the battery shall supply power. Furthermore, the battery comprises a fuse device 12 known per se of any design appropriate to the application in question. The fuse device 12 is connected in series with the battery cell 10 and is arranged to generate an interruption, in a well-known manner, of the electric connection between the battery cell 10 and the external terminal 16, when the fuse device 12 is exposed to an excessively strong electric current as a consequence of an occurred electric malfunction, such as a short circuit or an overvoltage from a charging device not disclosed herein.

A voltage-controlled active component 20 is connected in parallel to the battery cell 10 with the purpose of establishing a short circuit across the battery cell for releasing the fuse device 12, when the voltage across the battery cell exceeds a predetermined threshold value, as will be described below. The active component 20 has three terminals, wherein a first terminal 23 is connected to a node on the conductor between the external terminal 16 and the positive terminal of the battery cell 10 and wherein a second terminal 24 is connected to a node on the conductor between the external terminal 17 and the negative terminal of the battery cell 10. The third terminal 22 of the device 20 acts as a control input. A reference voltage device 30 is connected to this control input 22. Furthermore, the reference voltage device 30 is connected to the positive terminal of the battery cell. In the drawing the fuse device 12 is arranged between a node common to the positive terminal of the battery cell 10 and the reference voltage device 30 and a node common to the external terminal 16 and the active component 20. As an alternative, the fuse device may be arranged immediately prior to the external terminal 16, which is indicated in the drawing by a dashed rectangle 13.

The active component 20 has two possible operation modes: a substantially non-conductive state and a conductive state. In the non-conductive state the potential connection between the battery terminals are interrupted, wherein the device 20 plays a passive part in the circuit of FIG. 1. In the conductive state, however, the active component 20 plays a considerably active part in that it establishes a short circuit between the two battery terminals. As a consequence thereof the current through the fuse device 12 (or 13) is rapidly increased, thereby causing a release of the fuse device.

The voltage-controlled active component 20 is arranged to switch between the operating modes described above in response to the voltage value on its control input 22. The value of this control voltage is in turn determined by the reference voltage device 30. If the voltage across the terminals 23 and 24 of the active component 20 (i.e. essentially the terminal voltage of the battery cell 10) exceeds the reference voltage across the reference voltage device 30, the active component 20 will switch to its conductive state, wherein a short circuit and a release of the fuse device will follow.

In an exemplary embodiment of the present invention the voltage-controlled active component 20 is realized as a thyristor (SCR) or field effect transistor (MOSFET). Furthermore, the reference voltage device 30 is preferably realized as a zener diode. As previously mentioned, the fuse device 12 is preferably realized by any conventional fuse available on the market. Alternatively, the fuse function may be achieved by burning off some existing bond wire during the short circuit condition. Hence, the active component 20 as well as the devices 12 and 30 may be realized by simple and inexpensive components, thereby obviously allowing a simple and inexpensive overall solution for providing the safety functions described above to the rechargeable battery.

Figure 2:
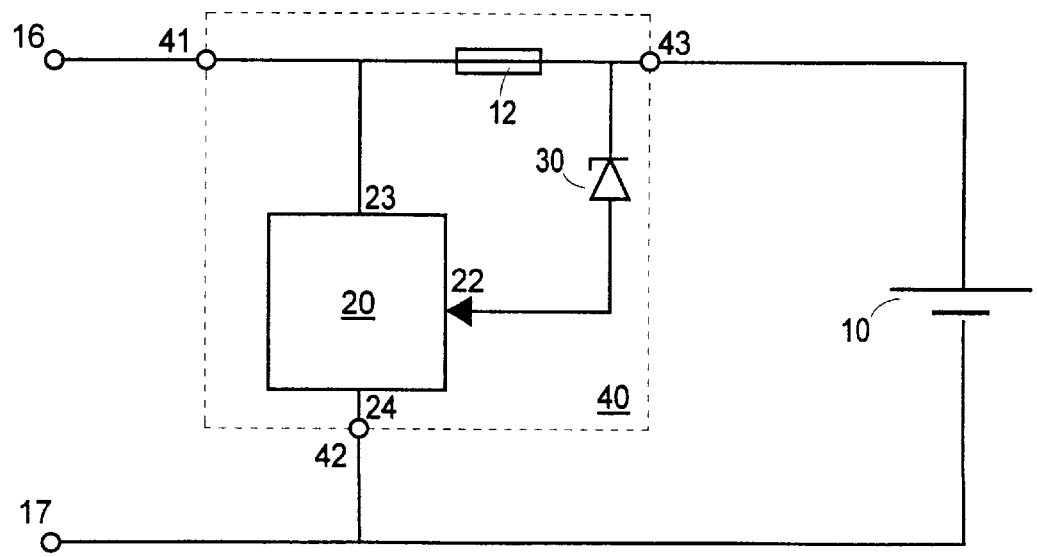

According to the preferred embodiment of the present invention, as illustrated in FIG. 2, the voltage-controlled active component 20, the reference voltage device 30 and the fuse device 12 are all realized as an integrated component 40 with three terminals 41–43, wherein the terminal 41 is arranged to be connected to the external terminal 16, the terminal 42 is arranged to be connected to the external terminal 17 or the negative terminal of the battery cell 10 and the terminal 43 is arranged to be connected to the positive terminal of the battery cell 10. The integrated component 40 may for instance be designed as a silicon chip, on which the transistor and the zener diode are formed and to which the fuse device is attached. Subsequently, the silicon chip is enclosed in a conventional capsule of plastics or ceramics. As an alternative the integrated component 40 may be realized as a hybrid circuit.

According to yet another alternative embodiment the voltage-controlled active component 20 are realized together with the reference voltage device 30 as a combined thyristor and zener diode (aka DIAC), the voltage levels of which are selected to match the normal levels for the battery type in question (such as about 4.1–4.3 V for normal lithium-based batteries).

The invention has been described above with reference to exemplary embodiments, but the invention is not limited to these embodiments. Hence, also other embodiments not disclosed herein are possible within the scope of protection of the invention, as defined by the appended independent patent claims.

What is claimed is:

1. A rechargeable battery for a portable electric apparatus, comprising:

at least one battery cell;

a fuse device connected in series with the battery cell;

a voltage-controlled active device, which is connected in parallel to the battery cell and which is arranged to assume a substantially non-conductive state and a conductive state, respectively, in response to the voltage at a control input; and a reference voltage device, which is connected to the control input of the active device, wherein the active device is arranged to switch from the non-conductive state to the conductive state, when the voltage across the battery cell deviates, by a predetermined value, from a reference voltage supplied by the reference voltage device, thereby establishing a short circuit across the battery cell and a release of the fuse device, and wherein the voltage-controlled active device, the reference voltage device and the fuse device form an integrated electronic component.

2. A rechargeable battery according to claim 1, wherein the active device is a thyristor.

3. A rechargeable battery according to claim 1, wherein the active device is a transistor.

4. A rechargeable battery according to claim 3, wherein the active device is a MOSFET transistor.

5. A rechargeable battery according to claim 1, wherein the reference voltage device is a zener diode.

6. A rechargeable battery according to claim 1, wherein the battery cell is of lithium type.

7. A rechargeable battery according to claim 1, wherein the reference voltage supplied by the reference voltage device approximatively corresponds to the normal terminal voltage of the battery cell, when the battery cell is fully charged.

8. A rechargeable battery according to claim 1, wherein the integrated electronic component is provided with three terminals.

* * * * *